Oct. 17, 1933.     O. U. ZERK     1,931,122
LUBRICATING APPARATUS
Filed Dec. 27, 1929

By Oscar U. Zerk
Inventor.

Patented Oct. 17, 1933

1,931,122

UNITED STATES PATENT OFFICE 1,931,122

LUBRICATING APPARATUS

Oscar U. Zerk, Chicago, Ill., assignor to Alemite Corporation, of Chicago, Ill., a corporation of Delaware Application December 27, 1929
Serial No. 416,824

10 Claims. (Cl. 221—47.4)

This invention relates to lubricating means and methods, and particularly to means and methods in which a lubricant gun is employed.

In lubrication by means of lubricant guns, two general types of apparatus are commonly employed. First, there is the interlocking type employing a coupling by means of which a nozzle on the gun may be temporarily locked during the lubricating period, to a lubricant receiving nipple on the bearing, machine, or the like to be lubricated; and second, there is the contact type whereby the lubricating gun nozzle and the lubricant receiving nipple are temporarily maintained in lubricant communicating contact by pressure between the nozzle and the nipple manually applied.

While my invention, broadly considered, is adaptable for use in connection with either of the above named types of apparatus, I have chosen to illustrate and describe herein the adaptation of my invention to the contact type.

My present invention is applicable to the type of apparatus illustrated in my co-pending applications Serial No. 396,352, filed September 30, 1929 (Case Z-11) and Serial No. 396,354, filed September 30, 1929 (Case Z-14) and represents and involves certain improvements relatively applicable thereto.

In prior lubricating constructions involving a discharge nozzle there commonly are two serious disadvantages. The first is that there is liability of leakage between the nozzle and the tubular support therefor, to which it is commonly secured, through the threads by which the nozzle is secured to the cylinder, during the lubricating period when the lubricant in the support is under pressure. The second disadvantage is that the pump piston tends to jam or stick in the cylinder due to the application of manual pressure to the piston eccentrically of the piston. This eccentric application of pressure is particularly troublesome when the piston is connected directly to a piston rod and the rod is provided with a handle for the application of thrust efforts to the piston.

It is very important that the piston shall have the minimum of play or clearance in the piston cylinder. This play or clearance should, preferably, be made not more than .001 of an inch. The piston rod in guns of this type is usually formed from round soft steel rod or wire by bending it in an automatic wire working machine to form the handle portion thereon and such material is not accurately round nor accurate in diameter. It has been found impracticable to machine the end of the piston rod to form the piston integrally therewith, because although a piston of correct and accurate size might thus be made, it would be impracticable in manufacture to maintain such a piston in axial alignment with the piston rod guide at the end of the gun opposite the cylinder. Due to the small allowable clearance referred to, the slightest variation from axial alignment of the piston and guide will cause the piston to stick or bind in the cylinder. Because of these difficulties, it has, therefore, become the common practice to make the piston separate from the piston rod and to connect them with a joint permitting oscillatory movement therebetween.

With such constructions, so long as the pressure applied by the handle to the piston rod is applied substantially axially or concentric with the piston rod and piston and with a negligible amount of side thrust on the piston, no serious difficulties are encountered; but, when the pistol grip type of handle is employed on the piston rod, the pressure on the rod is not co-axial therewith and the overhanging or off-set position of the handle on the piston rod exerts a great lateral pressure against the connection between the piston and rod which causes the piston to bind or stick in the cylinder.

In some prior constructions, to obviate this difficulty the pistol grip has been made extremely short, but this introduces another difficulty, namely that it causes the pressure of the hand on the grip to come in the sensitive palm portion of the hand and causes pain to the operator when applying pressure on the handle, a condition which is not true of the longer pistol grip handle on which the pressure comes on the less sensitive ball portion of the hand.

It is, therefore, an object of my invention to provide in a lubricant gun a connection between the pump piston and the piston rod which will not cause the piston to bind or jam in the cylinder irrespective of the eccentricity of application of pressure to the piston and/or the eccentricity and lateral thrust on the piston when pressure is applied by a pistol grip type of handle on the piston rod.

Another object of my invention is to provide a piston and piston rod construction for lubricant guns in which the piston may be oscillatably connected to the rod adjacent the end of the piston and the rod may have pressure applying engagement with the piston between the ends of the piston.

Another object of my invention is to design a simple connection between the pump piston and the piston rod which is non-binding or non-jamming, irrespective of how much eccentric pressure is exerted or at what eccentricity, the pressure of a pistol grip shaped grease gun handle may be applied.

Another object of my invention is to make the length of the pump piston of such size that it will be guided in the pump cylinder by the greater portion of its length at the beginning of its forward stroke.

Another object of my invention is to place the point of lateral contact between the piston rod end and the swivelly connected pump piston in a hollow portion of the pump piston.

Another object of my invention is to place the point of lateral pressure between the piston rod end and the hollow pump piston at a point which is placed beyond the outer end of the pump piston.

Another object of my invention is to let the point of contact of the lateral pressure between the hollow pump piston and the piston rod end be always exerted at a point inside of the piston cylinder guide.

Another object of my invention is to let the point of contact whereat the lateral pressure between the hollow pump piston end and the piston rod is exerted be disposed at a point between the two ends of the contacting portion of the piston.

Another object of my invention is to provide an improved dispensing element for a lubricating system providing an oscillatable discharge nozzle of improved form, adapted to make sealing engagement at the base of the nipple tip.

Another object of my invention is to provide an improved lubricant dispensing mechanism of the above type wherein disengagement of the oscillatable nozzle and the cooperant nipple will not readily be had even though the lubricating mechanism supporting the nozzle may be angularly deflected to a considerable degree relative to the axis of the nipple.

Another object of my invention is to provide in a lubricant dispensing mechanism of the above type improved means whereby a positive stop is effected to prevent an undue departure from longitudinal alignment of the oscillatable nozzle from the lubricant receiving nipple tip.

Another object is to provide a piston and piston rod construction in which the rod may engage the piston internally of the piston in a hollow portion thereof.

Another object is to provide a piston and piston rod construction in which the pressure from the piston rod may be applied to the piston adjacent that end of the piston opposite the piston rod connected thereto.

Another object is to provide a piston and piston rod construction in which the axial and/or lateral pressure communicated to the piston from the piston rod may be applied to the piston on the portions thereof at or beyond the medial zone of the piston axially considered in the direction away from the piston rod.

Another object is to provide a piston and piston rod construction in which the axial and/or lateral pressure communicated to the piston from the piston rod may be applied to the piston on the portions thereof at or beyond the medial zone of the piston axially considered in the direction away from the piston rod and internally of the piston with respect to its cylindrical surface.

Another object is to provide in a lubricant gun, a cylinder piston and piston rod construction in which the axial and/or lateral pressure communicated to the piston from the rod may be applied to the piston always at a point axially internal with respect to the end of the cylinder wall.

Another object of my invention is to provide in a lubricant gun, an integral pump compression cylinder and lubricant nipple engaging nozzle.

Another object is to provide an integral nozzle and pump cylinder construction which may be easily and quickly interchanged with the other parts of the lubricant gun.

Another object is to provide in a lubricant gun of the type employing a ball shaped nozzle piece sealed against lubricant leakage at the ball and socket portions thereof, a nipple engageable portion on the nozzle piece formed at the outer end of a substantially cylindrical recess in the nozzle piece, the recess permitting oscillation of the nozzle piece on the nipple.

Other objects of my invention and the invention itself will be better understood by reference to the following description of a certain embodiment of my invention illustrated in the accompanying drawing referred to in said description.

Figures 1, 2:
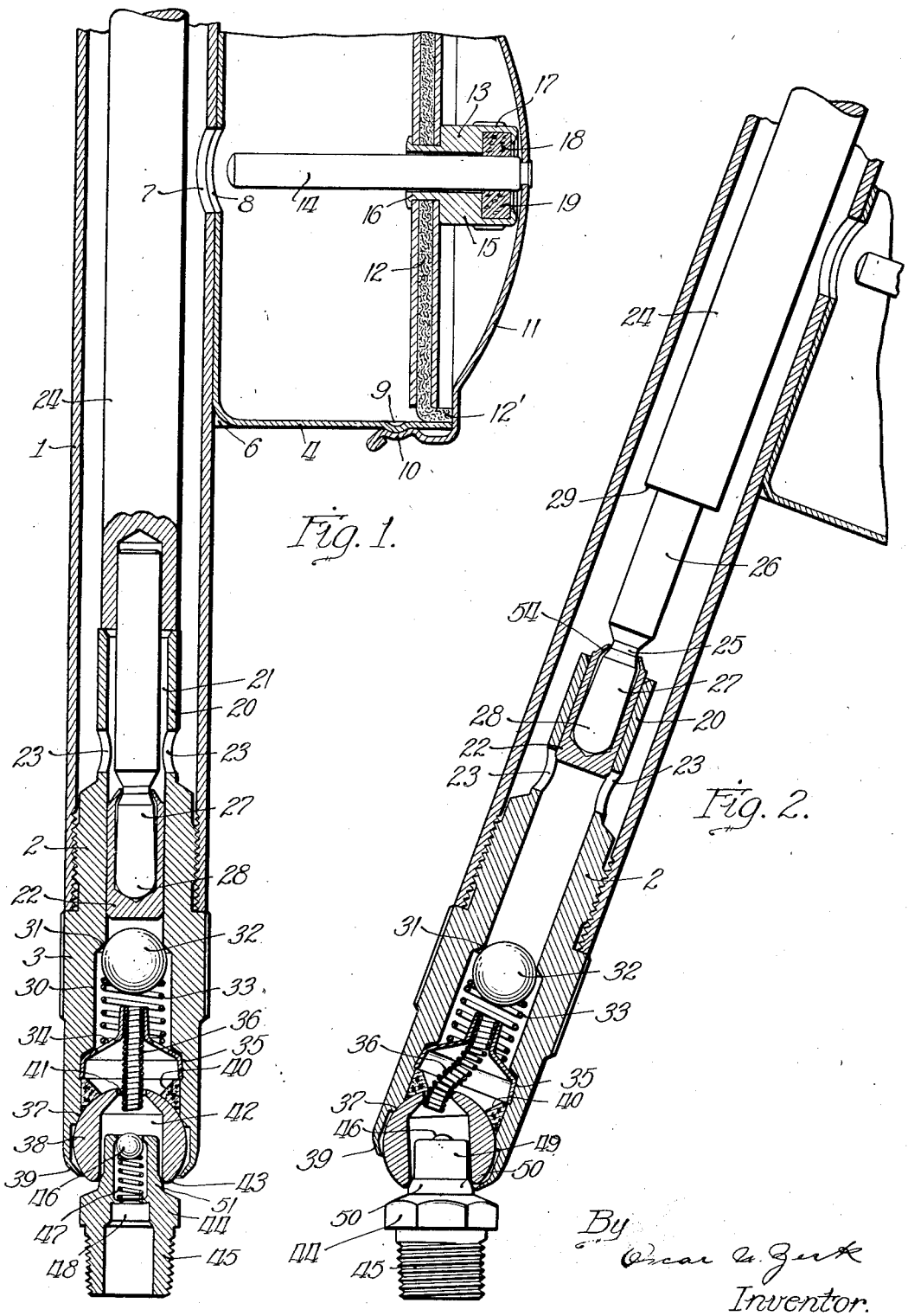
Fig. 1 is a side longitudinal sectional view of a lubricant gun in which my invention is embodied and with parts thereof broken away and showing a compression piston which I may employ at the end of its compression stroke.
Fig. 2 is a view similar to Fig. 1 with parts thereof in different positions and showing the piston at the end of its in-take stroke.

A grease gun of this general type is shown and described in my pending application, Serial No. 410,216, filed November 27, 1929 (Case Z-46), and in my aforesaid co-pending applications.

Referring now to the different figures of drawing in all of which like parts are designated by like reference characters, at 1 I show an elongated slender tube constituting the main barrel or body of the grease gun, and at 4, is shown a lubricant reservoir in the form of a shallow cup having an end wall 5 which is rigidly affixed to a lateral wall of the tube 1 by soldering the exterior surface of the tube 1 within a transversely grooved portion 6 of the end wall 5, the contiguous surface of the tube and cup end wall being closely sealed together so that lubricant passing through aligned openings 8 and 7 of the cup end wall and the lateral wall of the tube to communicate lubricant from the reservoir to the interior of the tube, cannot flow between the contiguous interengaging surfaces.

The cup is provided with an outwardly extending helical bead 9 near its rim over which a cooperatively threaded annular flange 10 of a cover cap 11 may be threaded to provide the reservoir cup 4 with a substantially leak proof covering.

A piston follower 12 comprising a cup leather packing disk having a tubular sealing flange 12 is disposed axially of the cup 4 with the flange 12' in lubricant sealing engagement therewith and extending toward the cap 11. The follower disk 12 is clamped between two centrally perforated metal plates 52 and 53. The follower is provided with a guide 13.

The guide 13 comprises a body portion 15 of generally cylindrical form axially bored out to slidably fit the rod 14 and having at one axial end a portion of reduced diameter forming a neck 16, which, after being inserted through a corresponding perforation in the follower 12 is spun over to rigidly secure the body portion 15 on the superposed plates and intermediate follower.

The other axial end of the body 15 is bored out to an enlarged internal diameter to provide a tubular portion 17. Within the recess thus formed is placed an annular ring of cork or like suitable packing material 18 sealingly fitting the rod 14, and sealingly engaging the inner wall of the tubular portion 17. The tubular portion 17 is then bent or spun over as at 19 to enclose or entrap the packing ring 18 and to cause the same to be secured to the guide 13.

Thus, by providing a relatively close fit between the follower 12 and the inner wall of the reservoir 4 and by providing a packing seal between the rod 14 and the follower 12, air on the outside of the follower 12 is prevented from leaking past the follower 12 into the lubricant in the reservoir and thus all of the lubricant unmixed with air may be discharged from the reservoir.

The tube or barrel 1 terminates in an internally threaded end adapted to receive the externally threaded shank 2 of a nose 3. Above the shank 2, the nose is reduced in diameter to form a pressure cylinder wall 20 of smaller outside diameter than the internal diameter of the tube 1, bored out axially as at 21 to provide a cylinder wall in which a cooperating pressure piston 22 may be reciprocated. The cylinder wall 20 is provided with a plurality such as two lubricant admitting ports 23—23.

The piston 22 is connected to the lower end of a piston rod 24 reciprocable axially in the tube 1 in any suitable manner such as by the usual handle on the upper end thereof, not shown, which handle may be of the commonly employed pistol grip type. The piston 22 is in the form of an axially elongated cup, the skirt of which is, at the open end thereof, bent inwardly as at 54 into an annular groove or neck 25 formed on the piston rod 24 formed upon a shank portion 26 of the piston rod 24.

The end of the shank 26 extends axially into the cup shaped piston 22 as at 27 and the extreme end thereof is given a spherical or hemi-spherical form as at 28 for engagement with the bottom of the cup 22 and/or with the inner side wall of the cup at points adjacent the bottom. Between the bottom of the cup and its outer open end, the internal diameter of the cup and the external diameter of the shank portion 27 vary with respect to the cup so as to provide a clearance, preferably a gradually increasing clearance between the portion 27 and the inner wall of the cup. A substantial amount of clearance is provided between the bent in end 24 of the piston and the neck 25 of the rod, and therefore, by this construction, the cup has a universal joint connection with the portion 27 on the extreme end 28 thereof and the piston 22 is free to align itself with the piston bore 20. Upon reciprocating the piston rod 24, the piston 22 may be withdrawn, say, to the position shown in Fig. 2 or may be propelled forwardly to the position shown in Fig. 1. The shank 26 is of sufficiently reduced diameter to follow the piston into the cylinder bore without engaging the wall of the bore, and the shoulder 29 on the piston rod 24 at the termination of the shank may abut against the outer end of the cylinder wall 20 to limit the inward stroke of the piston.

As will be understood, upon retracting the piston beyond the ports 23, lubricant which fills the tube 1, openings 7 and 8 and the reservoir 4 will be drawn through the ports 23 into the bore of the piston; and upon propelling the piston into the cylinder beyond the ports 23, a quantity of lubricant will be forced ahead of the piston.

The cylinder bore 21 constitutes part of a conduit 30 extending axially entirely through the nose 3. At its lower termination, the bore 21 is enlarged to provide a shoulder or valve seat 31 to function as the seat of a ball check valve 32 resiliently maintained on the seat by a spring 33, one end of which abuts upon the ball and the other end of which abuts upon the sloping wall of a funnel shaped element 34, preferably formed from sheet metal. The downwardly open large end of the funnel shaped element rests upon a shoulder 35 formed on the inner wall of the conduit 30 in the nose and the small end of the funnel shaped element 34 projects axially into the spring 33 and has press-fitted thereinto a closely wound helical spring 36 normally disposed axially of the nose 3. Adjacent the lower end of the nose, the conduit is provided with a concavely spherical seat 37 upon which is seated a convexly spherical nozzle piece 38. The extreme lower end of the nose 3 is bent or turned inwardly as at 39 to a smaller diameter than that of the nozzle piece 38 to retain the latter in the nose and to adapt it to be oscillatably retained in the socket 37. The ball and socket joint 37—38 thus provided is sealed by an annular packing element 40 having a convexly spherical portion engaging the nozzle 38, and compressed between the nozzle piece 38 and the lower annular edge of the funnel shaped element 34 which projects from or overlaps the shoulder 35 above referred to.

The nozzle piece 38 has a generally cylindrical recess 42 extending axially therethrough, the upper end of which is of reduced diameter to provide an aperture 41 into which the lower end of the spring like conduit 36 projects. At the extreme lower end of the recess 42, the annular edge formed thereby on the nozzle piece 38 is rounded or flared to provide an annular convexly curved rim or contact edge 43 for the nozzle piece for adapting the nozzle to engage a lubricating nipple, to be described, with lubricant sealing pressure contact.

By means of the construction described above, the nose 3 and other parts of the gun secured thereto may be oscillated on the nozzle piece 38 or vice versa and at all positions, the ball and socket joint 37—38 will be sealed and by way of the spring 36 a lubricant conduit comprising the cylinder bore 21, spring 36 and recess 42 is provided through the nose, and the nozzle piece 38 is at all times retained in its normal co-axial position shown in Fig. 1, or is normally returned thereto from such positions as that shown in Fig. 2 by the resiliency of the spring 36 in a manner that will be understood.

At 44 I have shown a lubricant nipple with which the above described gun is adapted to be used; the nipple being provided with a screw threaded portion 45 by which it may be secured to a bearing element or the like to be lubricated. Internally, the nipple is provided with an axially disposed lubricant conduit, the upper end of which is of reduced diameter to provide a valve seat for a valve ball 46 retained on the seat by the thrust of a spring 47 abutting upon one end and at the other upon suitably disposed prongs and an annular shoulder 48 within the nipple. The upper tip portion of the nipple 47 and ball 46 is formed generally cylindrical as at 49 and at the base of the cylindrical tip portion is an enlarged annular convexly rounded bead 50.

The cylindrical portion 49 is substantially smaller in diameter than the diameter of the recess 42 in the nozzle piece and the maximum diameter of the bead 50 is greater than that of the recess 42 whereby when the nozzle piece 38 is applied to the nipple 44 the cylindrical portion 49 may enter the recess and the lower annular edge 43 of the nozzle piece will engage the bead 50 with sealing pressure contact and the nozzle piece 38 may oscillate universally thereon in accordance with the clearance between the cylindrical portion 49 of the nipple and the wall of the recess 42.

The nipple shown in the drawing is generally similar to that shown in my said co-pending applications, but as an added feature of improvement, disclosed herein, I so form the annular bead shown at 51, so that its longitudinally rounded radii, which are relatively greater than the radii of longitudinal curvature of the similar bead forming a like contact surface in my prior said co-pending applications.

By virtue of this arrangement, the pressure of engagement by the annular edge 43 of the nozzle piece is intensified so that with the same thrust pressure of the nozzle against the annular contact surface of the nipple a sealing pressure of a much greater value is effected, whereby due to the reactive fluid pressure of lubricant contained in the space 42, the loss of lubricant from between the approximately annular contact surfaces of the nozzle and nipple will be more greatly resisted by the lateral component of thrust effected by the wedging contact.

As disclosed herein, the radius of longitudinal curvature of the bead 51 is increased relative to those as disclosed in my co-pending applications fifty per cent, but this relative curvature may be varied within the scope of the improvement hereby disclosed.

In the operation of my invention, when applying the gun to the nipple, the nozzle piece 38 is always normally in its axial position illustrated in Fig. 1, and the recess 42 thereof may be presented to the nipple and telescoped over the cylindrical portion 49 of the nipple. The gun barrel and nose may be oscillatably moved out of axial alignment with the nipple to clear the gun from undesirable or interfering engagement with parts of the machine or the like to be lubricated and in any position, pressure contact between the nozzle piece 38 and the nipple 44 may be obtained and the seal of the contact engagement between the nozzle piece and the nipple will be facilitated by the oscillatory movement permitted by the nozzle piece and the nipple, above described.

By providing the compression cylinder bore 21 in the nose of the gun, all possibility of leakage between the nose and its point of attachment to the barrel 1 is removed. The construction by which the piston 22 is connected to the piston rod 24 permits the piston to align itself with the cylinder bore 21 in a manner to prevent binding of the piston in the bore and to effect smooth and free movement thereof at all times.

My invention is not limited to the exact details of construction shown and described herein inasmuch as many changes and modifications may be made herein without departing from the spirit of my invention or sacrificing its advantages.

I claim:

1. In a lubricant gun, a barrel, a nose connected thereto, a compression cylinder in the nose, a socket in the nose, a spherical nozzle piece in the socket, a cylindrical nipple engageable recess in the nozzle piece, and spring pressed means for sealing the socket.

2. In a lubricant gun, a barrel, a nose connected thereto, a socket in the nose, a spherical nozzle piece in the socket, sealing means for the nozzle piece and socket, and a lubricant conduit comprising a compression cylinder in the nose, a plunger operating in said cylinder, and a cylindrical nipple engageable recess in the nozzle piece.

3. In a lubricant gun, a barrel, a nose connected thereto, a socket in the nose, a spherical nozzle piece in the socket, sealing means for the nozzle piece and socket, and a lubricant conduit comprising a compression cylinder in the nose, a plunger operating in said cylinder, a cylindrical nipple engageable recess in the nozzle piece, and a check valve between the cylinder and the nozzle piece.

4. In a lubricant gun, a nose, a socket in the nose, a spherical nozzle piece in the socket, a cylindrical nipple receivable recess in the nozzle piece, and an annular nipple engageable contact portion at the end of the recess, the recess being of larger diameter than the nipple portion to be received thereby to permit oscillation of the nozzle piece on the nipple.

5. A lubricant coupler, comprising the combination of a lubricant dispensing mechanism, a tubular outlet therefor, a substantially spherical dispensing nozzle oscillatably mounted within the end of the tubular outlet having a longitudinal bore therethrough, and a lubricant receiving nipple having a supporting stem and a lubricant receiving tip, an anteriorly disposed end portion of the nozzle bore being cylindrical and of sufficient diameter to receive the said nipple tip, said nipple being substantially cylindrical and having an annular divergent outer surface extending from the base of the tip toward the stem engageable with substantially annular surface portions of the nozzle embracing said bore.

6. In combination, a lubricant conveying tube having an interiorly disposed spherical seat, a longitudinally bored spherical nozzle oscillatable on said seat and a lubricant receiving nipple having a tip adapted to be received within said bore and engageable with a substantially annular surface of said nozzle by a substantially annular divergent surface to establish substantially wedging lubricant sealing contact between surfaces of said nozzle and nipple surrounding said bore and said tip and resilient means normally to maintain said nozzle bore and said conveying tube in alignment.

7. In combination, a lubricant dispensing tube, a longitudinally bored spherical nozzle having a cylindrical nipple receiving portion therein, said nozzle being oscillatable within said tube, a nipple having a slender tip receivable in said bore and provided with an annular divergent surface proceeding from said tip beyond the mouth of the bore, said divergent surface engageable with an annular surface of the nozzle said annular surface of the nozzle being oscillatable about the annular divergent surface of the nipple.

8. A lubricant coupler, comprising the combination of a lubricant dispensing mechanism, a tubular outlet therefor, a substantially spherical dispensing nozzle oscillatably mounted within the end of the tubular outlet having a longitudinal bore therethrough, and a lubricant receiving nipple having a supporting stem and a cylindrically tubular lubricant receiving tip, the diameter of an anteriorly disposed substantially cylindrical end portion of the nozzle bore being sufficiently great to receive the said nipple tip, said nipple having substantially annular divergent outer surfaces extending from the base of the tip toward the stem engageable with substantially annular surface portions of the nozzle embracing said bore, the engaging surface of said nozzle and nipple being relatively so disposed as to be relatively oscillatable and as to effect substantially wedging contact.

9. In combination, a lubricant conveying tube having an interiorly disposed spherical seat, a longitudinally bored spherical nozzle oscillatable on said seat and a lubricant receiving nipple having a tip adapted to be received within said bore and engageable with a substantially annular surface of said nozzle by a substantially annular divergent surface to establish substantially wedging lubricant sealing contact between surfaces of said nozzle and nipple surrounding said bore and said tip, the engaging surface of said nozzle and nipple being relatively so disposed as to be relatively oscillatable and as to effect substantially wedging contact and means for maintaining the bore of said nozzle in alignment with said conveying tube.

10. In combination, a lubricant dispensing tube, a longitudinally bored spherical nozzle having a cylindrical nipple receiving portion, said nozzle being oscillatable within said tube, resilient means for maintaining said nozzle bore and said dispensing tube in alignment, a nipple receivable in said bore, a portion thereof having an annular divergent surface, said nipple being slightly smaller than said bore whereby the nipple receiving portion of said nozzle may be oscillated about the annular divergent surface of the nipple.

OSCAR U. ZERK.